United States Patent
Neuzil et al.

(10) Patent No.: US 11,143,328 B2
(45) Date of Patent: Oct. 12, 2021

(54) HEALTH MONITORING FOR PROPORTIONAL ACTUATORS

(71) Applicant: HONEYWELL INTERNATIONAL INC., Morris Plains, NJ (US)

(72) Inventors: Jan Neuzil, Brno (CZ); Tomas Puller, Prostejov (CZ); Eric Arnett, Grabger, IN (US); Tomas Rudolecky, Brno (CZ); Veronika Poliakova, Tisnov (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 247 days.

(21) Appl. No.: 16/293,755

(22) Filed: Mar. 6, 2019

(65) Prior Publication Data
US 2020/0284376 A1 Sep. 10, 2020

(51) Int. Cl.
*F16K 37/00* (2006.01)
*B64D 45/00* (2006.01)
*G01D 5/14* (2006.01)

(52) U.S. Cl.
CPC .......... *F16K 37/0041* (2013.01); *B64D 45/00* (2013.01); *G01D 5/14* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 5,719,566 A | * | 2/1998 | Readman ........... B64D 45/0005 244/178 |
| 7,567,862 B2 | | 7/2009 | Pelton et al. |

(Continued)

FOREIGN PATENT DOCUMENTS

| | | |
|---|---|---|
| EP | 0957418 A2 | 11/1999 |
| EP | 2202600 A2 | 6/2010 |

(Continued)

OTHER PUBLICATIONS

Macaluso, A., et al.; Prognostic and Health Management System for Fly-by-wire Electra-Hydraulic Servo Actuators for detection and tracking of actuator faults; ScienceDirect; 2017.

*Primary Examiner* — Jonathan M Dager
*Assistant Examiner* — Garrett F Evans
(74) *Attorney, Agent, or Firm* — Lorenz & Kopf, LLP

(57) ABSTRACT

A computer-implemented method for determining a scheduled maintenance session for a proportional actuator includes transmitting a command signal to a controller of the proportional actuator and generating, using the controller, a drive signal for controlling the proportional actuator using the command signal. The position of a component actuator of the proportional actuator is changed, on the basis of the drive signal, and the position of the component actuator is measured, using a sensor, and a position feedback signal is generated on the basis of the measurement. A condition indicator is estimated, with a processor, using only one of the command signal, the drive signal, or the position feedback signal. A health indicator is estimated, with the processor, using the condition indicator, and a scheduled maintenance session of the proportional actuator is determined, with the processor, using the health indicator.

17 Claims, 7 Drawing Sheets

(56) References Cited

U.S. PATENT DOCUMENTS

| | | | |
|---|---|---|---|
| 10,706,361 B1* | 7/2020 | Ethington | G06N 5/04 |
| 2017/0069145 A1 | 3/2017 | Dorket et al. | |
| 2017/0166328 A1 | 6/2017 | Ethington et al. | |
| 2017/0184138 A1 | 6/2017 | Smith et al. | |

FOREIGN PATENT DOCUMENTS

| | | | |
|---|---|---|---|
| EP | 2595021 A1 | 5/2013 | |
| JP | 2007327606 A | 12/2007 | |

* cited by examiner

HEALTH MONITORING FOR PROPORTIONAL ACTUATORS

TECHNICAL FIELD

The present disclosure generally relates to techniques for the health monitoring of proportional actuators, and more specifically relates to techniques for the health monitoring of electrohydraulic servo-valves.

The project leading to this application has received funding from the Clean Sky 2 Joint Undertaking under the European Union's Horizon 2020 research and innovation programme under grant agreement No 686782.

BACKGROUND

Aircraft downtime, where an aircraft is not operational, can be costly for an aircraft operator. One unavoidable instance of aircraft downtime is scheduled maintenance of the aircraft. Unscheduled maintenance of the aircraft, however, can sometimes be avoided by monitoring the status or "health" of aircraft components and determining if a component needs to be replaced prior to failure of that component. The component can then be replaced at a scheduled maintenance session prior to component failure instead of at an unscheduled maintenance session to replace the component after component failure has occurred. Replacing a component during a scheduled maintenance session before component failure is both easier and also reduces aircraft downtime.

Although some health monitoring techniques for aircraft components exist, these health monitoring techniques generally rely upon a complex analysis of multiple information sources (such as various control or feedback signals) from various different sub-systems of the aircraft. In certain situations, for example where it is not possible to obtain access to a certain information source due to technical, legal or commercial restrictions, it is not possible to implement these known health monitoring techniques.

Furthermore, other known health monitoring techniques are "reactive", in that an indication is only provided when a component has actually failed. These known reactive health monitoring techniques do not provide a prediction as to when a certain component might fail in the future. It is not possible to efficiently schedule maintenance sessions on the basis of these types of reactive health monitoring techniques.

It is therefore desirable to provide predictive health monitoring for an aircraft component. Furthermore, it is also desirable to provide predictive health monitoring for aircraft components in situations where only a subset of all of the potential sources of information about that component are available due to various restrictions.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

In an exemplary embodiment, there is provided a computer-implemented method for determining a scheduled maintenance session for a proportional actuator. The method includes the step of transmitting a command signal to a controller of the proportional actuator and generating, using the controller, a drive signal for controlling the proportional actuator on the basis of the command signal. The method includes the step of changing, on the basis of the drive signal, a position of a component actuator of the proportional actuator and measuring, using a sensor, the position of the component actuator and generating a position feedback signal on the basis of the measurement. The method includes the step of estimating, with a processor, a condition indicator using only one of the command signal, the drive signal or the position feedback signal, the condition indicator being indicative of a progressive degradation of the proportional actuator. The method also includes the step of estimating, with the processor, a health indicator using the condition indicator, the health indicator being indicative of a probability of failure of the proportional actuator at one or more future times. The method also includes the step of determining, with the processor, a time for a scheduled maintenance session of the proportional actuator on the basis of the estimated health indicator.

In an exemplary embodiment, there is provided a computer-implemented method for determining a scheduled maintenance session for a proportional actuator. The method includes the step of transmitting a command signal to a controller of the proportional actuator and generating, using the controller, a drive signal for controlling the proportional actuator using the command signal. The method also includes the step of changing, on the basis of the drive signal, a position of a component actuator of the proportional actuator and measuring, using a sensor, the position of the component actuator. The method also includes the step of generating a position feedback signal on the basis of the measurement and estimating, with a processor, a condition indicator using at least two of: the command signal, the drive signal or the position feedback signal, the condition indicator being indicative of a progressive degradation of the proportional actuator. The method also includes the step of estimating, with the processor, a health indicator using the condition indicator, the health indicator being indicative of a probability of failure of the proportional actuator at one or more future times. The method includes the step of determining, with the processor, a time for a scheduled maintenance session of the proportional actuator using the health indicator.

In an embodiment, there is provided a hydromechanical system. The hydromechanical system includes a proportional actuator comprising a controller and a component actuator, the controller being operable to generate a drive signal for changing a position of the component actuator on the basis of a command signal received at the controller, The hydromechanical system further comprises a sensor configured to measure a position of the component actuator and to generate a position feedback signal based on the measured position. The hydromechanical system further comprises a processor configured to estimate a condition indicator using only one of: the command signal, the drive signal or the position feedback signal, the condition indicator being indicative of a progressive degradation of the proportional actuator; and estimate a health indicator using the estimated condition indicator, the health indicator being indicative of a probability of failure of the proportional actuator at one or more future times; and determine a time for a scheduled maintenance session of the proportional actuator on the basis of the health indicator. In an embodiment, the processor is configured to record the condition indicator for processing at a later time.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

After an extensive analysis of which components of the aircraft are the cause of a relatively large amount of unscheduled maintenance sessions, it was determined by the present inventors that a common cause of unscheduled maintenance sessions is the failure of proportional actuators, such as aircraft electrohydraulic servo-vales (EHSVs). As such, the below description of exemplary health monitoring techniques will be explained with respect to the operation of EHSVs. It will be appreciated that the exemplary health monitoring techniques disclosed herein are applicable to other aircraft components, such as other types of proportional actuators.

Figure 1:
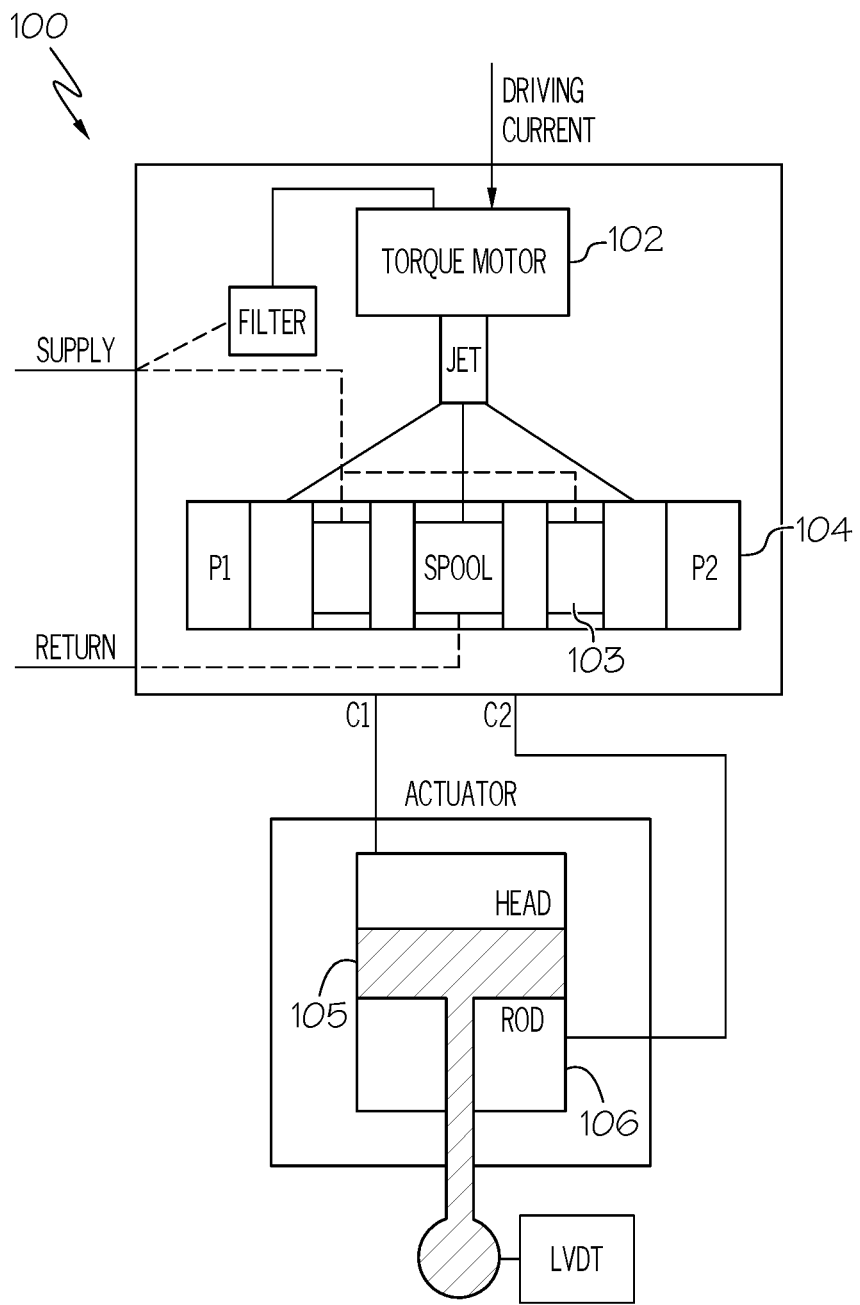
FIG. 1 is a schematic of an electrohydraulic servo-valve in accordance with exemplary embodiments.

The operation of an exemplary EHSV 100 is briefly described below with respect to FIG. 1. The EHSV 100 shown in FIG. 1 is a two-stage EHSV. The EHSV 100 operates by supplying a control signal (hereinafter referred to as a "driving current") to a torque motor 102. The torque motor 102 acts to adjust the pressure P1, P2 on either side of a second stage spool 103 so as to displace the spool within a second stage spool valve 104. The displacement of the spool 103 within the second stage valve 104 acts to displace a piston arm 105 within a component actuator of a first stage valve 106. The output of the first stage valve 106 may be used for various functions, such as metering fuel as part of a fuel control system, or for aircraft control surface actuation.

One use of an EHSV is in a Compressor Variable Geometry (CVG) actuator within a hydro-mechanical system. A hydro-mechanical system is configured to supply a metered quantity of fuel to an aircraft engine. In order to perform this function, the hydro-mechanical system is further configured to actuate compressor variable stator vanes throughout a hydraulic actuation system.

Figure 2:
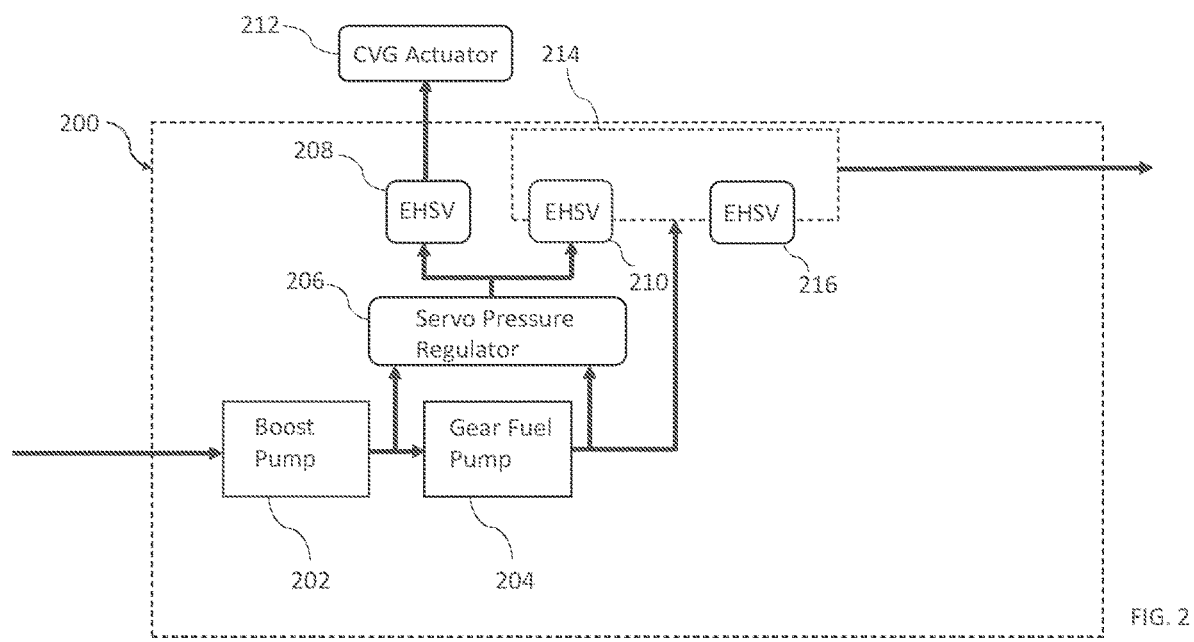
FIG. 2 shows a schematic of a hydro-mechanical system valve in accordance with exemplary embodiments.

A schematic of an exemplary hydro-mechanical system 200 is shown in FIG. 2. The flow of fuel through the hydro-mechanical system is shown through the use of solid arrows. In the embodiment shown in FIG. 2, the hydro-mechanical system 200 includes a boost pump 202 configured to pressurize the fuel and a gear fuel pump 204. A servo pressure regulator 206 is configured to supply fuel at a fixed pressure to a compressor variable geometry (CVG) EHSV 208 and to a metering valve EHSV 210. The compressor variable geometry EHSV 208 is configured to output fuel to a CVG actuator 212 for actuation of variable stator vanes. The metering valve EHSV 210 is configured to regulate the flow of fuel in a fuel control unit (FCU) 214 configured to supply fuel received from the gear fuel pump 204 to an engine (not shown). The FCU 214 may also include an overspeed/shut-off EHSV 216 configured to facilitate an engine "shut-off" procedure in overspeed conditions.

As can be seen in FIG. 2, the hydro-mechanical system includes multiple EHSVs. Any one of the CVG EHSV 208, the metering valve EHSV 210 or the overspeed/shut-off EHSV 216 may need to be replaced or repaired at a maintenance session due to wear. The various wear mechanisms that can be experienced by the various EHSVs are set out in the table below.

| Part of EHSV | Wear mechanism |
| --- | --- |
| Spool valve | Friction caused by the gradual buildup of contaminants eventually leads to stiction or seizure of the valve |
| Torque motor | Component failures in the torque motor cause a decrease in the magnetomotive force that is able to be generated by the motor |
| Spool/Sleeve | Wearing/eroding of internal surfaces of the EHSV spool/sleeve |
| EHSV body | Leakage of fluid from the EHSV body |

The present inventors recognized that the most common wear mechanism for EHSV is an increase in friction in the spool valve of the EHSV. In particular, in many applications, the EHSV meters servo-fuel which is generally operated at a high temperature. This high temperature of fuel can create a build-up of varnish in the second stage of the EHSV, which increases the friction experienced by the spool valve in this second stage of the EHSV. As such, the monitoring and predicting for when stiction or seizure of a spool valve of an EHSV will occur due to this increased friction of the spool valve in the second stage of the EHSV would reduce the number of unscheduled maintenance sessions required to replace or repair the EHSV spool valve. It was discovered that, for certain EHSV designs, a frictional force of more than about 7 lbf present in the second stage of the EHSV would reduce the efficiency and accuracy of the EHSV, and an increasing frictional force in excess of 7 lbf (for example up to about 30 lbf) necessitates the replacement of the EHSV.

In order to implement a health monitoring system, it is necessary to base the determination of the health of the EHSV component, for example the spool valve, on some source of information.

Figure 3:
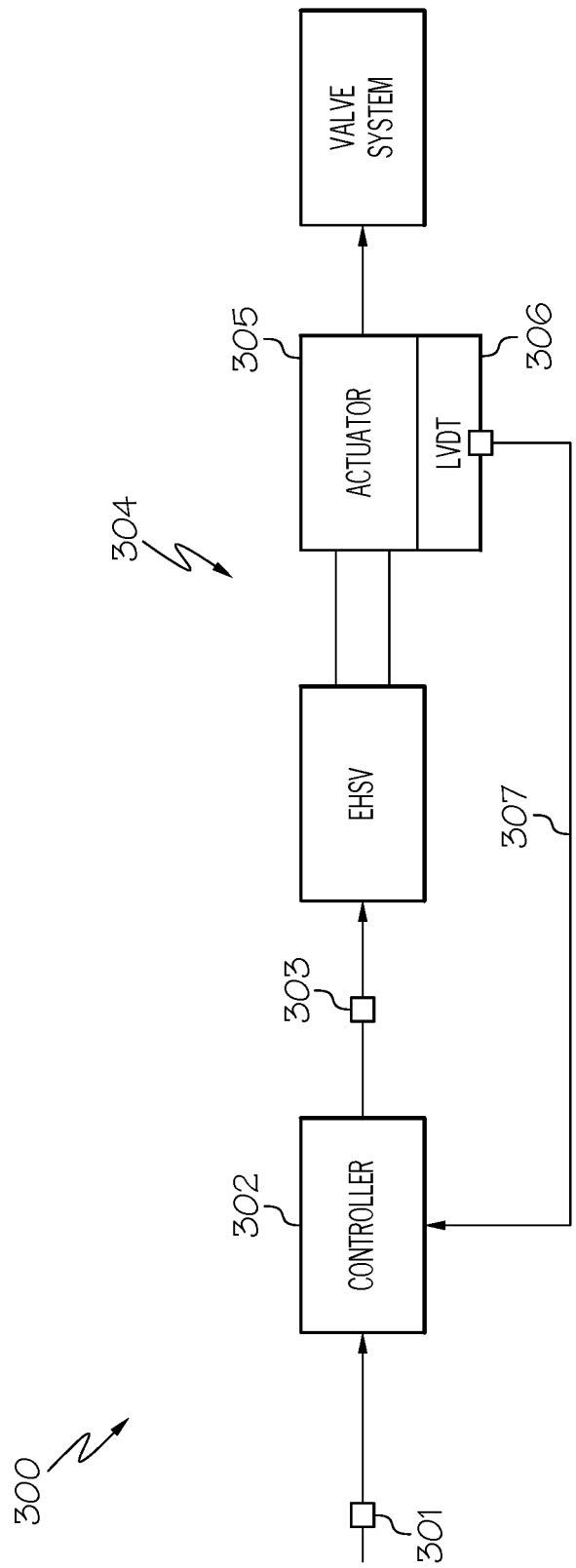
FIG. 3 is a schematic showing the control signals required for operation of an electrohydraulic servo-valve in accordance with various exemplary embodiments.

FIG. 3 shows a block diagram 300 showing the various systems used to control an EHSV. As can be seen in FIG. 3, a command signal 301 is transmitted to an EHSV controller module 302, the command signal 301 indicating a desired condition (for example a desired position of internal vanes in a CVG system, a desired fuel flow rate, or another desired condition depending on the function of the EHSV). The controller module 302 converts the command signal 301 into a driving current signal 303 for a torque motor of the EHSV 304. The driving current signal 303 causes the torque motor to displace the spool in the spool valve of the second stage of the EHSV 304 so as to cause displacement of the piston arm in the component actuator 305 of the first stage of the EHSV and thereby implement the desired condition indicated in the command signal 301.

In exemplary embodiments, a position sensor, for example a linear variable differential transformer 306, is operably connected to the component actuator 305 of the first stage of the EHSV 304 to determine the actual amount of displacement of the component actuator 305. The position sensor 306 is configured to transmit a position signal 307 to the controller module 302. The controller module 302 can then adjust the driving current signal 303 supplied to the torque motor on the basis of the position signal 307 to ensure an accurate displacement of the component actuator 305 of the EHSV 304. For example, the position signal 307 can be compared to the command signal 301 to determine a difference (error) between these two signals. If a difference between these two signals is detected, it is likely that wear is adversely affecting the operation of the EHSV 304.

The command signal 301, the driving current signal 303 and the position signal 307 can be used for health monitoring of the EHSV, for example by comparing the position signal 307 to the command signal 301 to determine an error between these two signals and then using this error to determine the operational status of the EHSV, in the manner described previously. However, in certain situations, technical, legal or commercial restrictions mean that access to one or more of these signals 301, 303, 307 is restricted. In these situations, it would be desirable to monitor the operational status of the EHSV 304 on the basis of only one of the command signal 301, the driving current signal 303 or the position signal 307. In particular, since frictional build-up due to contamination of the spool valve in the second stage of the EHSV 304 is the most common cause of inaccuracy or failure of the EHSV 304, it would be desirable to monitor the current amount of friction in the spool valve and to predict how the friction will develop over a future time period so as to schedule a planned maintenance session to replace or repair the EHSV 304 prior to stiction or total seizure of the spool valve of the EHSV 304.

Figure 4A:
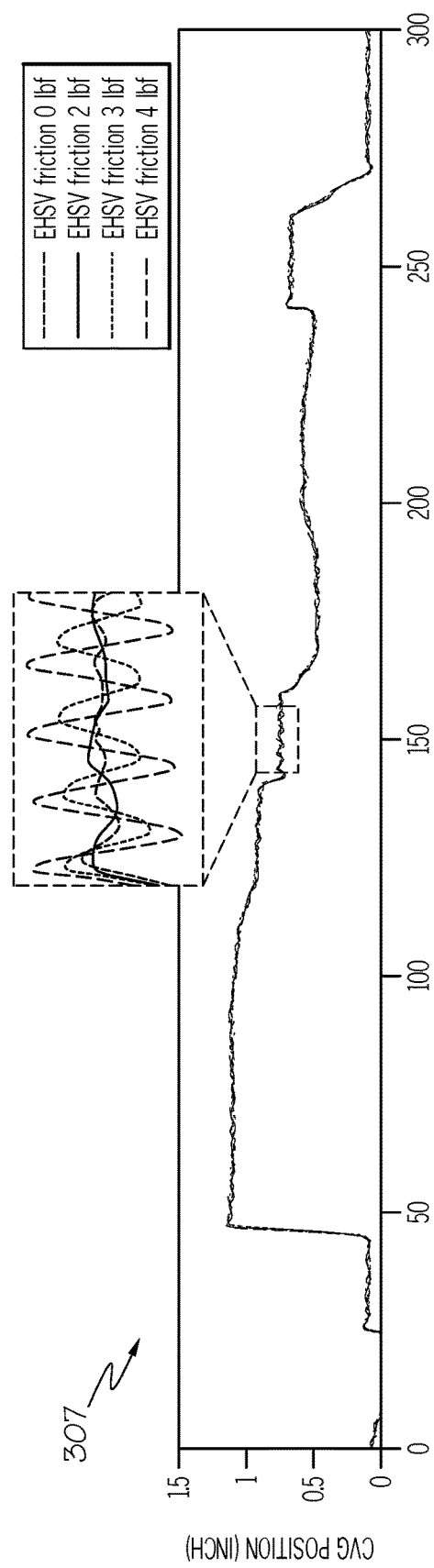
FIGS. 4A and 4B, respectively, show the development of oscillatory behavior in the position and driving current signals shown in FIG. 3.
Figure 4B:
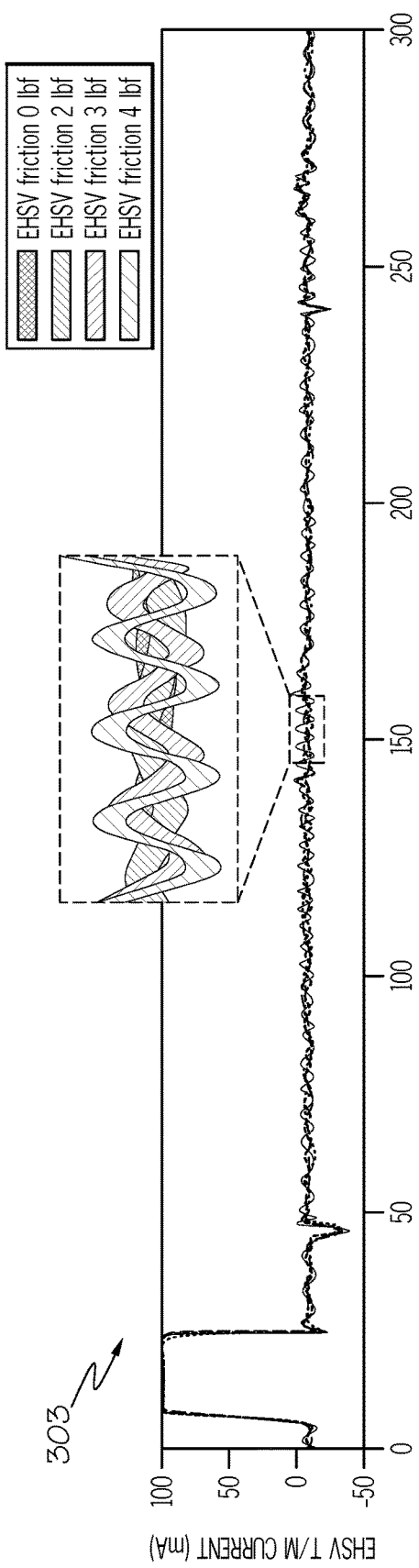

This object is achieved through various embodiments as described herein. In particular, the inventors conducted a study as to the effect of increasing EHSV spool friction on each one of the command signal 301, driving current signal 303 and position signal 307. It was found that an increase in EHSV second stage spool valve friction led to oscillatory behavior in each one of these signals, with the amplitude of the oscillations increasing with increasing friction of the spool valve. In particular, it was found that for a frictional force in the spool valve of about 2 lbf or less, the oscillatory behavior of each of these signals is attenuated to an extent where the oscillations cannot be reliably detected. It was also found that a frictional force in the spool valve of about 3 lbf or more results in observable oscillations in each one of these signals, and that the amplitude of these observable oscillations increases with increasing friction. FIGS. 4A and 4B show exemplary oscillations in the driving current signal 303 and the position signal 307 for various levels of spool friction. As can be seen in FIGS. 4A and 4B, the amplitude of oscillations in each one of these signals increases with increasing spool friction.

Since the oscillatory behavior develops in each one of the command signal (not shown), the driving current signal 303, and the position signal 307, with increasing friction, only one of these signals is required for health monitoring of the EHSV.

An exemplary method for health monitoring according to embodiments of the present invention is described with reference to the flowchart S500 shown in FIG. 5. In exemplary embodiments, the steps of the flowchart S500 are computer-implemented steps performed by a processor. In exemplary embodiments, the processor is mounted on the vehicle. In alternative exemplary embodiments, the processor is remote from the vehicle.

In Step S501, a single signal is received by a processor and this single signal is analyzed to determine a condition indicator. As defined herein, a condition indicator refers to a measurement of a detectable characteristic of the signal which indicates a change in the function of a proportional actuator (for example an EHSV). In exemplary embodiments, this change is related to the progressing development of a failure mode in the EHSV. In exemplary embodiments, condition indicators are determined through a time-series statistical analysis of the single signal; through a frequency analysis of the single signal, or through a residual signal analysis of the single signal. A preferred condition indicator is a time-series statistical feature of the single signal, for example the presence of oscillatory behavior in the single signal with respect to time. Using the presence or absence of oscillatory behavior in the single signal allows for a robust, simple detection technique for the development of a failure mode within the EHSV. In exemplary embodiments, the single signal is either a command signal for commanding an output of the proportional actuator, a driving current signal for driving a torque motor associated with the proportional actuator, or a position signal for indicating the present position of a component actuator of the proportional actuator.

The condition indicator determined in Step S501 is trendable, such that the characteristic associated with the condition indicator develops in an expected manner with respect to the development of the failure mode/wear mechanism of the EHSV. For example, as explained previously, the amplitude (for example the peak-to-peak amplitude) of the oscillations present in the received signal increase with increasing friction in the spool valve. This increase in oscillation amplitude is proportional to the increase in the amount of friction in the spool valve.

In exemplary embodiments, the oscillations in the received signal caused due to friction in the spool valve have a period of about 3 to abut 5 seconds. In an embodiment, the signal is measured using a sampling rate of about 0.5 Hz or more, for example about 1 Hz, about 2 Hz, about 3 Hz, about 4 Hz, about 5 Hz, about 10 Hz or about 20 Hz.

After determination of the condition indicator, the method progresses to step S502. In Step S502, a health indicator is determined by the processor using the condition indicator and knowing the relationship between the condition indicator and the development of the failure mode/wear mechanism. As defined herein, the term "health indicator" refers to a probabilistic estimate as to the likelihood of failure of the proportional actuator at the current time and at future times. In exemplary embodiments, the health indicator is determined based on a pre-determined probabilistic model that associates a condition indicator value to an amount of progression/development of a failure mode/wear mechanism. In exemplary embodiments, the probabilistic model associates the condition indicator value to a rate of progression of the failure mode.

In exemplary embodiments, the health indicator is also determined using information regarding the status of the system within which the proportional actuator is incorporated. For example, the inventors found that, for aircraft EHSVs, the condition indicator may change during different flight phases of an aircraft (such as "take-off", "mid-flight", or "ground idle" flight phases) for the same level of progression of the failure mode. More specifically, the peak-to-peak amplitude of the oscillatory behavior in the received signal may be smaller in a "ground idle" flight phase as compared to a "take-off" flight phase for the same level of friction present in the proportional actuator. In various exemplary embodiments, the processor receives information regarding the flight phase of the aircraft from an external source and determines the heath indicator based on both of the determined condition indicator and the received flight phase information.

After determination of the health indicator, the method progresses to step S503. At step S503, the health indicator is analyzed by the processor to determine a future time at which the probability of failure of the proportional actuator exceeds a pre-determined threshold value. In exemplary embodiments, the probability of failure of the proportional actuator is proportional to the progression of the wear mechanism of the proportional actuator. For example, if the frictional force in the spool valve of an EHSV develops quasi-linearly over time, a linear extrapolation of the health indicator may be performed so as to determine a future time at which the amount of friction in the spool valve is estimated to have increased to a certain amount, such as 30 lbf, at which seizure of the EHSV is very likely to occur. In exemplary embodiments, the estimated future activity of the aircraft is also taken into account in this determination. For example, the future activity of the aircraft may be estimated based on an expected level of use of the aircraft over a future time period and the amount of progression of the failure mode expected to occur over that future time period.

After this future time is determined in step S503, the method progresses to step S504. At step S504, the processor indicates that a maintenance session should be scheduled prior to a determined future time at which the probability of failure of the proportional actuator exceeds a pre-defined threshold amount, such as about 50%. In this manner, the amount of unscheduled maintenance sessions required to maintain operational status of the aircraft may be reduced.

In essence, the method described with respect to flowchart S500 allows the detection of proportional actuator failure mode/wear mechanism propagation and an estimation of a future time at which the detected failure mode/wear mechanism will cause failure or inefficient operation of the proportional actuator. The method then indicates that a scheduled maintenance session should take place prior to this future time in order to reduce the likelihood that an unscheduled maintenance session is required due to failure of the proportional actuator.

Figure 6:
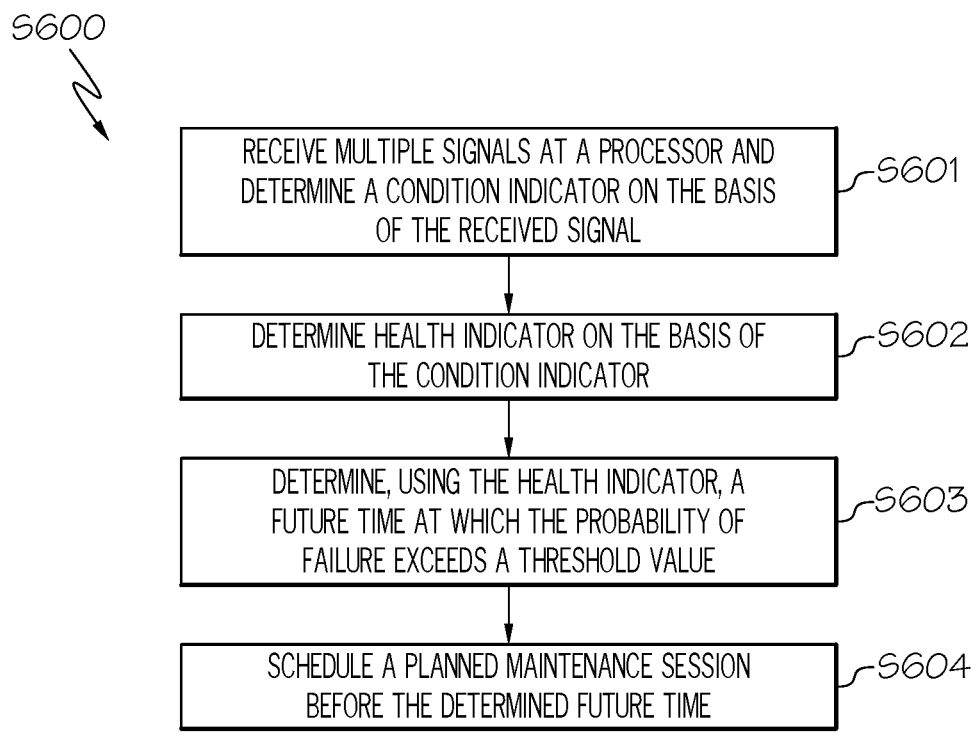
FIG. 6 shows another flowchart illustrating a method in accordance with exemplary embodiments.

An alternative method according to exemplary embodiments is set out in the flowchart S600 shown in FIG. 6. The alternative method set out in FIG. 6 is applicable in situations where there are no restrictions regarding access to certain sources of information, such as control signals.

In Step S601, multiple signals are received by a processor. These multiple signals are analyzed to determine a condition indicator indicative of the progressing development of a failure mode in the EHSV. In exemplary embodiments, condition indicators are determined through a time-series statistical analysis of the multiple signals; through a frequency analysis of the multiple signals, or through a residual signal analysis of the multiple signals. A preferred condition indicator is a time-series statistical feature of the multiple signals, for example the presence of oscillatory behavior in the single signal with respect to time. Using the presence or absence of oscillatory behavior in the multiple signals allows for a robust, simple detection technique for the development of a failure mode within the EHSV.

In exemplary embodiments, the multiple signals include at least two of a command signal for commanding an output of the proportional actuator, a driving current signal for driving a torque motor associated with the proportional actuator, or a position signal for indicating the present position of a component actuator of the proportional actuator. In exemplary embodiments, these signals are combined to determine the condition indictor. For example, the command signal may be compared to the position signal to determine an error signal associated with the difference between the commanded position of the proportional actuator and the actual position of the proportional actuator. This error signal may then be analyzed for the presence of oscillatory behavior.

The condition indicator determined in Step S601 is trendable, such that the characteristic associated with the condition indicator develops in an expected manner with respect to the development of the failure mode in the EHSV. For example, as shown in FIG. 4, the amplitude of the oscillations present in the multiple received signals increase with increasing friction in the spool valve. This increase in oscillation amplitude is proportional to the amount of friction in the spool valve.

In exemplary embodiments, the oscillations in the received signal caused due to friction in the spool valve have a period of about 3 to about 5 seconds. In an embodiment, the signal is measured using a sampling rate of about 0.5 Hz or more, for example about 1 Hz, about 2 Hz, about 3 Hz, about 4 Hz, about 5 Hz, about 10 Hz or about 20 Hz.

After determination of the condition indicator, the method progresses to step S602. In Step S602, a health indicator is determined by the processor using the condition indicator and knowing the relationship between the condition indicator and the development of the failure mode. In exemplary embodiments, the health indicator is determined based on a pre-determined probabilistic model that associates a condition indicator value to an amount of progression/development of a failure mode. In exemplary embodiments, the probabilistic model associates the condition indicator value to a rate of progression of the failure mode.

In exemplary embodiments, the health indicator is also determined using information regarding the status of the system within which the proportional actuator is incorporated. In various exemplary embodiments, the processor receives information regarding the flight phase of the aircraft from an external source and determines the heath indicator based on both of the determined condition indicator and the received flight phase information.

After determination of the health indicator, the method progresses to step S603. At step S603, the health indicator is analyzed by the processor to determine a future time at which the probability of failure of the proportional actuator exceeds a pre-determined threshold value. For example, the pre-determined threshold value may correspond to a 50% chance of failure. In exemplary embodiments, the probability of failure of the proportional actuator is proportional to the progression of the wear mechanism of the proportional actuator. In exemplary embodiments, the estimated future activity of the aircraft is also taken into account in this determination.

After this future time is determined in step S603, the method progresses to step S604. At step S604, the processor indicates that a maintenance session should be scheduled prior to the determined future time in order to replace or repair the proportional actuator. In this manner, the amount of unscheduled maintenance sessions required to maintain operational status of the aircraft may be reduced.

The use of multiple signals for determination of the condition indicator can increase the accuracy of the condition indicator, thereby consequently increasing the accuracy of the health indicator determined on the basis of the condition indicator.

In either one of methods shown in S500 and S600, the step of scheduling a maintenance session may include transmitting, by a transmitter in operable connection with the processor, a signal to a remote device that a maintenance session should be scheduled prior to the determined future time. Additionally or alternatively, the step of scheduling a maintenance session may include recording onto a storage medium in operable communication with the processor a record that a maintenance session should be scheduled prior to the determined future time.

Figure 7:
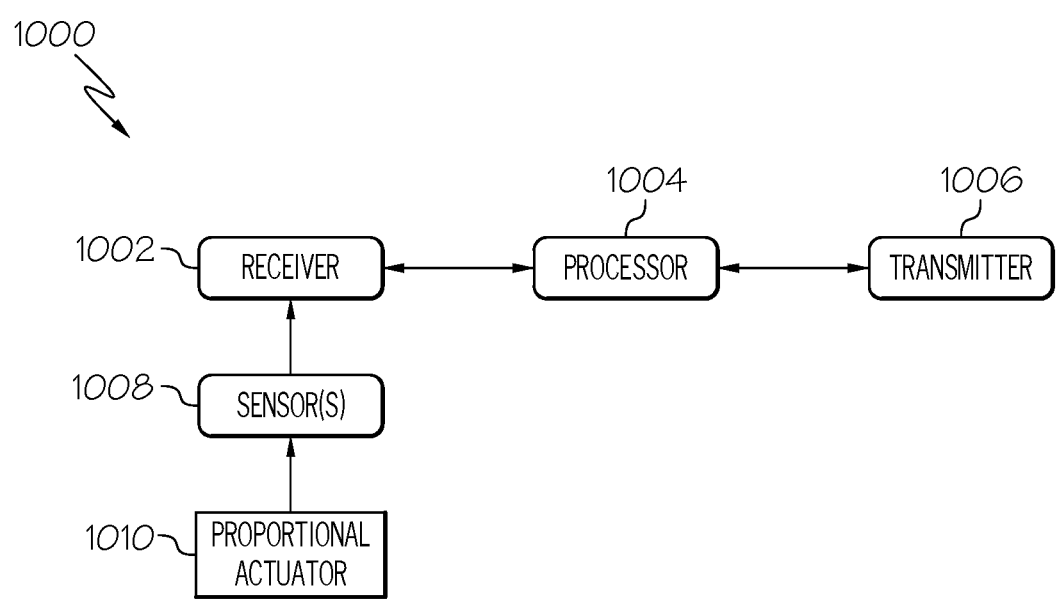
FIG. 7 shows a system in accordance with exemplary embodiments.

A system in accordance with exemplary embodiments is shown in FIG. 7. The system 1000 shown in FIG. 10 includes a receiver 1002, a transmitter 1006, and a processor in operable communication with each of the receiver 1002 and the transmitter 1006.

The system 1000 further includes one or more sensors 1008 for analysis of signals associated with a proportional actuator 1010. Control signals and/or parameters associated with the function of the proportional actuator 1010 are sensed by the one or more sensors 1008 and are transmitted to the receiver 1002. In an exemplary embodiment, the signals associated with the function of the proportional actuator sensed by the one or more sensors 1008 include a command signal, a driving current signal configured to drive a torque motor of the proportional actuator 1010 and a position signal related to the position of a component actuator of the proportional actuator 1010.

Figure 5:
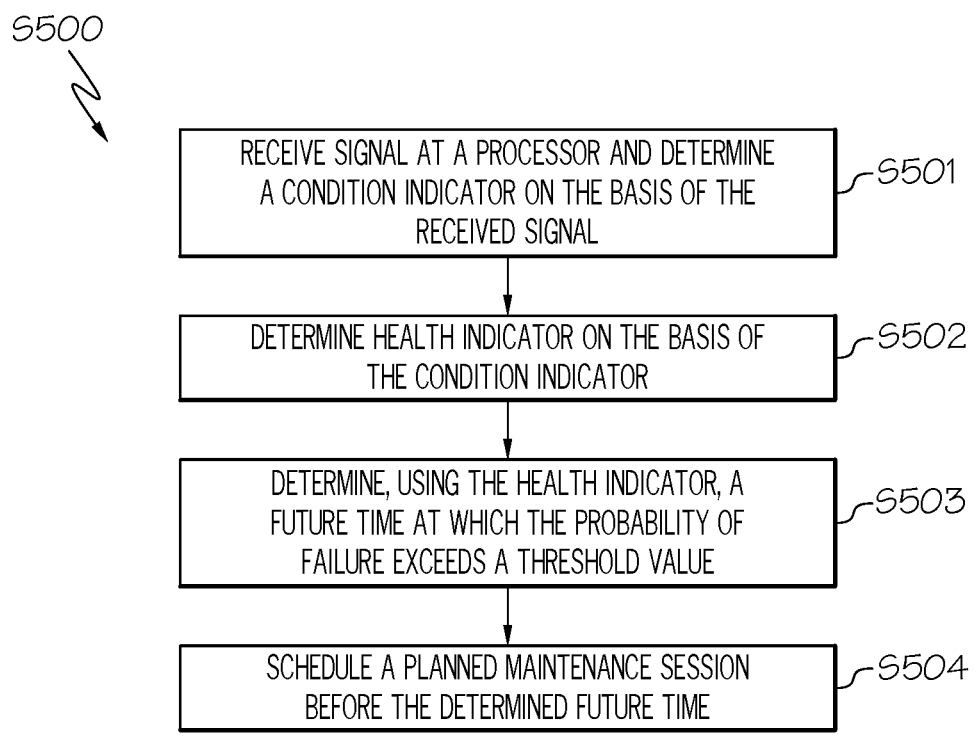
FIG. 5 shows a flowchart illustrating a method in accordance with exemplary embodiments.

In use, the processor 1004 is configured to perform a method corresponding to one of the above methods shown in FIG. 5 or 6.

It will be appreciated that the techniques disclosed above may be used in the health monitoring of other types of proportional actuators, and not just electrohydraulic servo-valves used in CVG systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer-implemented method for determining a scheduled maintenance session for a proportional actuator, the method comprising:
   transmitting a command signal to a controller of the proportional actuator;
   generating, using the controller, a drive signal for controlling the proportional actuator using the command signal;
   changing, on the basis of the drive signal, a position of a component actuator of the proportional actuator;
   measuring, using a sensor, the position of the component actuator and generating a position feedback signal on the basis of the measurement;
   estimating, with a processor, a condition indicator using only one of the command signal, the drive signal or the position feedback signal, the condition indicator being indicative of a progressive degradation of the proportional actuator, wherein the condition indicator is estimated based on an amplitude of detected oscillations in the one of the command signal, the drive signal or the position feedback signal;
   estimating, with the processor, a health indicator using the condition indicator, the health indicator being indicative of a probability of failure of the proportional actuator at one or more future times; and
   determining, with the processor, a scheduled maintenance session of the proportional actuator on the basis of the estimated health indicator.

2. The computer-implemented method of claim 1, wherein the proportional actuator is an aircraft electrohydraulic servo-valve.

3. The computer-implemented method of claim 2, wherein the aircraft electrohydraulic servo-valve is included in a compressor variable geometry actuator.

4. The computer-implemented method of claim 1, wherein the step of determining the scheduled maintenance session comprises comparing the probability of failure of the proportional actuator at the one or more future times to a pre-defined threshold and selecting a future time where the probability of failure is less than the pre-defined threshold for the scheduled maintenance session.

5. The computer-implemented method of claim 1, wherein the sensor comprises a linear variable differential transformer.

6. The computer-implemented method of claim 2, wherein the step of estimating the condition indicator further comprises obtaining a current flight phase and estimating the condition indicator using the only one of the command signal, the drive signal or the position feedback signal, and also the current flight phase.

7. A computer-implemented method for determining a scheduled maintenance session for a proportional actuator, the method comprising:
   transmitting a command signal to a controller of the proportional actuator;

generating, using the controller, a drive signal for controlling the proportional actuator using the command signal;

changing, on the basis of the drive signal, a position of a component actuator of the proportional actuator;

measuring, using a sensor, the position of the component actuator and generating a position feedback signal on the basis of the measurement;

estimating, with a processor, a condition indicator using at least two of: the command signal, the drive signal or the position feedback signal, the condition indicator being indicative of a progressive degradation of the proportional actuator, wherein the condition indicator is estimated based on an amplitude of detected oscillations in the at least two of the command signal, the drive signal or the position feedback signal;

estimating, with the processor, a health indicator using the condition indicator, the health indicator being indicative of a probability of failure of the proportional actuator at one or more future times; and determining, with the processor, a scheduled maintenance session of the proportional actuator using the estimated health indicator.

8. The computer-implemented method of claim 7, wherein the proportional actuator is an aircraft electrohydraulic servo-valve.

9. The computer-implemented method of claim 8, wherein the aircraft electrohydraulic servo-valve is included in a compressor variable geometry actuator.

10. The computer-implemented method of claim 7, wherein the step of determining the scheduled maintenance session comprises comparing the probability of failure of the proportional actuator at the one or more future times to a pre-defined threshold and selecting a future time where the probability of failure is less than the pre-defined threshold for the scheduled maintenance session.

11. The computer-implemented method of claim 7, wherein the sensor is a linear variable differential transformer.

12. The computer-implemented method of claim 8, wherein the step of estimating the condition indicator further comprises obtaining a current flight phase and estimating the condition indicator using the at least two of the command signal, the drive signal or the position feedback signal, and also the current flight phase.

13. A hydromechanical unit, comprising:

a proportional actuator comprising a controller and a component actuator, the controller operable to generate a drive signal for altering a position of the component actuator on the basis of a command signal received at the controller;

a sensor configured to measure a position of the component actuator and to generate a position feedback signal based on the measured position; and a processor configured to estimate a condition indicator using only one of: the command signal, the drive signal or the position feedback signal, the condition indicator being indicative of a progressive degradation of the proportional actuator, wherein the condition indicator is estimated based on an amplitude of detected oscillations in the one of the command signal, the drive signal or the position feedback signal; and estimate a health indicator using the estimated condition indicator, the health indicator being indicative of a probability of failure of the proportional actuator at one or more future times; and determine a scheduled maintenance session of the proportional actuator using the health indicator.

14. The hydromechanical unit of claim 13, wherein the proportional actuator is an aircraft electrohydraulic servo-valve.

15. The hydromechanical unit of claim 14, wherein the hydromechanical unit includes a compressor variable geometry actuator, and wherein the aircraft electrohydraulic servo-valve is included in the compressor variable geometry actuator.

16. The hydromechanical unit of claim 13, wherein the processor is configured to determine the scheduled maintenance session by comparing the probability of failure of the proportional actuator at the one or more future times to a pre-defined threshold and selecting a future time where the probability of failure is less than the pre-defined threshold for the scheduled maintenance session.

17. The hydromechanical unit of claim 13, wherein the processor is configured to estimate the condition indicator also on the basis of a current flight phase.

* * * * *